United States Patent
Ogura (12) 
(10) Patent No.: US 6,519,353 B1
(45) Date of Patent: Feb. 11, 2003

(54) MOTION VECTOR DETECTING APPARATUS AND METHOD AND DISTRIBUTION MEDIUM

(75) Inventor: Eiji Ogura, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/383,770

(22) Filed: Aug. 26, 1999

(30) Foreign Application Priority Data

Aug. 28, 1998 (JP) ............................................. 10-243095

(51) Int. Cl.[7] ................................................. G06K 9/00
(52) U.S. Cl. ........................ 382/107; 348/169; 375/240; 382/236
(58) Field of Search ................................. 382/100, 107, 382/154, 232, 236, 240, 305–307; 341/67; 345/419, 501; 348/208, 169, 394.1, 699; 375/240, 240.16; 708/203; 383/232; 358/140

(56) References Cited

U.S. PATENT DOCUMENTS

| | | | | |
|---|---|---|---|---|
| 4,838,685 A | * | 6/1989 | Martinez et al. | 352/85 |
| 4,989,087 A | * | 1/1991 | Pele et al. | 358/136 |
| 5,067,160 A | * | 11/1991 | Omata et al. | 382/107 |
| 5,208,667 A | * | 5/1993 | Saunders | 358/140 |
| 5,210,605 A | * | 5/1993 | Zaccarin et al. | 358/105 |
| 5,267,334 A | * | 11/1993 | Normille et al. | 382/236 |
| 5,490,247 A | * | 2/1996 | Tung et al. | 348/15 |
| 5,497,203 A | * | 3/1996 | Kayashima et al. | 348/699 |
| 5,598,514 A | * | 1/1997 | Purcell et al. | 383/232 |
| 6,023,295 A | * | 2/2000 | Pau | 348/405 |
| 6,040,861 A | * | 3/2000 | Boroczky et al. | 348/409 |

* cited by examiner

Primary Examiner—Jayanti K. Patel
(74) Attorney, Agent, or Firm—Frommer Lawrence & Haug LLP; William S. Frommer; Darren M. Simon (57) ABSTRACT

A motion vector detecting circuit calculates a residual between the reference block read from a frame memory and retrieving block at the predetermined position of a retrieving frame to output to an operation control circuit. The operation control circuit discriminates whether a residual value supplied from the motion vector detecting circuit is larger than the threshold value Th1 and the threshold value Th2 which is smaller than Th1 or not respectively and controls the vector detecting circuit corresponding to such discrimination result. When the residual value is larger than the threshold value Th1, the motion vector detecting circuit instructs execution of the motion vector detecting process utilizing the comparatively wider retrieving range. When the residual value is less then the threshold value Th1 and is larger than the threshold value Th2, the motion vector circuit instructs execution of the motion vector detecting process utilizing the comparatively narrower retrieving range. Moreover, when the residual value E is less than the threshold value Th2, the motion vector detecting circuit instructs stop of execution of the motion vector detecting process. As explained above, the motion vector detecting process can be executed corresponding to the input image data.

4 Claims, 6 Drawing Sheets

MOTION VECTOR DETECTING APPARATUS AND METHOD AND DISTRIBUTION MEDIUM

BACKGROUND OF THE INVENTION

1. Field of the Invention

The present invention relates to a motion vector detecting apparatus and method and distribution medium and particularly to a motion vector detecting apparatus and method and distribution medium which can efficiently detect motion vector and controls power consumption.

2. Description of the Related Art

For example, in MPEG (Moving Picture Experts Group), he motion vector is detected and it is then used to encode (compress) moving picture data. As a method of detecting this motion vector, a full search block matching method can be considered.

The principle of the full search block matching method to be executed in the motion vector detecting apparatus will be explained below with reference to FIG. 8. For example, when the motion vector for retrieving frame 112 is detected from the reference frame 111, the reference block 121 is set first to the predetermined position of the reference frame 111 and the retrieving range 131 is then set to the predetermined position of the retrieving frame 112.

As explained above, when the reference block 121 and retrieving range 131 are set, a part of the same size as the reference block 121 is extracted as the predetermined specified retrieving block 122 from the retrieving range 131 and residual from the reference block 121 is calculated. Usually, the retrieving blocks 122 of the number proportional to the size of the retrieving range 131 is extracted from the retrieving range 131 in order to calculate residual between respective retrieving block 122 and the reference block 121. Accordingly, a plurality of residuals may be obtained. As explained above, the motion vector can be detected based on the positional relationship between the retrieving block 122 having the smallest value and the reference block 121 among the calculated residuals.

For example, when the reference block 121 includes an image of automobile A, if the part not including the image of automobile A indicated by a solid line in the retrieving frame 112 is extracted as the retrieving block 122, residual between the reference block 121 and retrieving block 122 becomes large. Moreover, for example, when the part including the image of automobile A indicated by the frame of dotted line in the retrieving frame 112 is extracted as the retrieving block 122 in the figure, an image of the reference block 121 becomes more similar to that of the retrieving block 122 and thereby residual becomes small value. data indicating the position in the retrieving, range 131 of the retrieving block 122 indicating the smallest residual among the residual from the reference block 121 is detected as the motion vector.

By the way, in the motion vector detecting apparatus for detecting the motion vector based on the full search blocking method, residual between the reference block 121 and a plurality of retrieving blocks 122 extracted from the retrieving range 131 is calculated. Thereby, a large amount of electrical power is consumed to execute such arithmetic operation, resulting in a problem that power consumption of the motion vector detecting apparatus becomes large. Therefore, the method for controlling power consumption by stopping the operation of the motion vector detecting apparatus when it is no longer required to detect the motion vector has been proposed by "E. Miyagoshi, et al., "100 mm$^2$ 0.95 W Single-Chip MPEG2 MP@ML Video Encoder with a 128 GOPS Motion Estimator and a Multi-Tasking RISC-Type Controller", Digest of Technical Papers ISSCC'98, pp. 30–31, February 1998" and "M. Mizuno, et al., "A 1.5 W Single-Chip MP@ML MPEG2 Encoder with Low Power Motion Estimation and Clocking", Digest of Technical Papers ISSCC'97, pp. 256–257, February 1997".

However, in such a motion vector detecting apparatus, the motion vector to be detected, for example, can be assumed to be zero vector (V(0,0)) or that similar to it. When in the case of stationary image for which the comparatively narrow retrieving range 131 is allowed or in the case of the moving image which is moving slowly, the retrieving range 131 of the same width as the moving image which moves quickly assuring large motion vector to be detected and requesting comparatively wide range as the retrieving range 131 is set.

Therefore, the process which is not particularly required (for example, arithmetic processing) is executed. As a result, here rises a problem that power consumption cannot be controlled sufficiently in the motion vector detecting apparatus.

SUMMARY OF THE INVENTION

The present invention has been proposed considering such situation and it is therefore an object of the present invention to effectively detect the motion vector and control the power consumption.

According to one aspect of the present invention, a motion vector detecting apparatus is characterized in comprising an executing means for extracting retrieving block from the retrieving range preset to the retrieving frame and then obtaining a residual between the extracted retrieving block and reference block of reference frame in order to execute the motion vector detecting process to detect the motion vector from the retrieving block which minimizes residual, an arithmetic means for calculating residual between the first image data corresponding to the reference frame and second image data corresponding to the retrieving frame and a control means for controlling the retrieving range of the executing means.

According to another aspect of the present invention, a motion vector detecting method is characterized in comprising the executing step for extracting the retrieving block from the retrieving range preset to the retrieving frame and obtaining a residual between the extracted retrieving block and reference block of the reference frame to execute the motion vector detecting process to detect the motion vector from the retrieving block which minimizes the residual, the calculating step for calculating a residual between the first image data corresponding to the reference frame and second image data corresponding to the retrieving frame and the control step for controlling the retrieving range in the executing step corresponding to the calculation result in the calculating step.

According to still another aspect, the distribution medium is characterized is distributing the computer readable program for executing the processes including the executing step for extracting the retrieving block from the retrieving range preset to the retrieving frame and obtaining a residual between the extracted retrieving block and reference block of the reference frame to execute the motion vector detecting process to detect the motion vector from the retrieving block which minimizes the residual, the calculating step for calculating a residual between the first image data corresponding to the reference frame and second image data corresponding to the retrieving frame and the control step for controlling the retrieving range in the executing step corresponding to the calculation result in the calculating step.

In the motion vector detecting apparatus, motion vector detecting method and distribution medium explained above, the retrieving block is extracted from the retrieving range set to the retrieving frame, a residual between the extracted retrieving block and reference block of reference frame is obtained, the motion vector detecting process for detecting motion vector from the retrieving block which minimizes the residual is executed, a residual between the first image data corresponding to the reference frame and the second image data corresponding to the retrieving frame is calculated and the retrieving range can be controlled corresponding to the calculation result.

DETAILED DESCRIPTION OF THE PREFERRED EMBODIMENTS

A preferred embodiment of the present invention will be explained. Here, in view of making clear the. correspondence between each means of the present invention and the embodiment, the characteristic of the present invention will be explained by adding the corresponding embodiment (only an example) within the parentheses after each means. However, description of each means will never provide any limitation.

The motion vector detecting apparatus of the present invention is characterized in comprising an executing means (for example, motion vector detecting circuit 11 of FIG. 1) for extracting the retrieving block from the retrieving range set to the retrieving frame, obtaining a residual between the extracted retrieving block and reference block of the reference frame to execute the motion vector detecting process to detect motion vector from the retrieving block which minimizes the residual, a calculating means (for example, motion vector detecting circuit 12 of FIG. 1) for calculating a residual between the first image data corresponding to the reference frame and the second image data corresponding to the retrieving frame and a control means (for example, operation control circuit 13 of FIG. 1) for controlling the retrieving range of the executing means corresponding to the calculation result of the calculating means.

Figure 1:
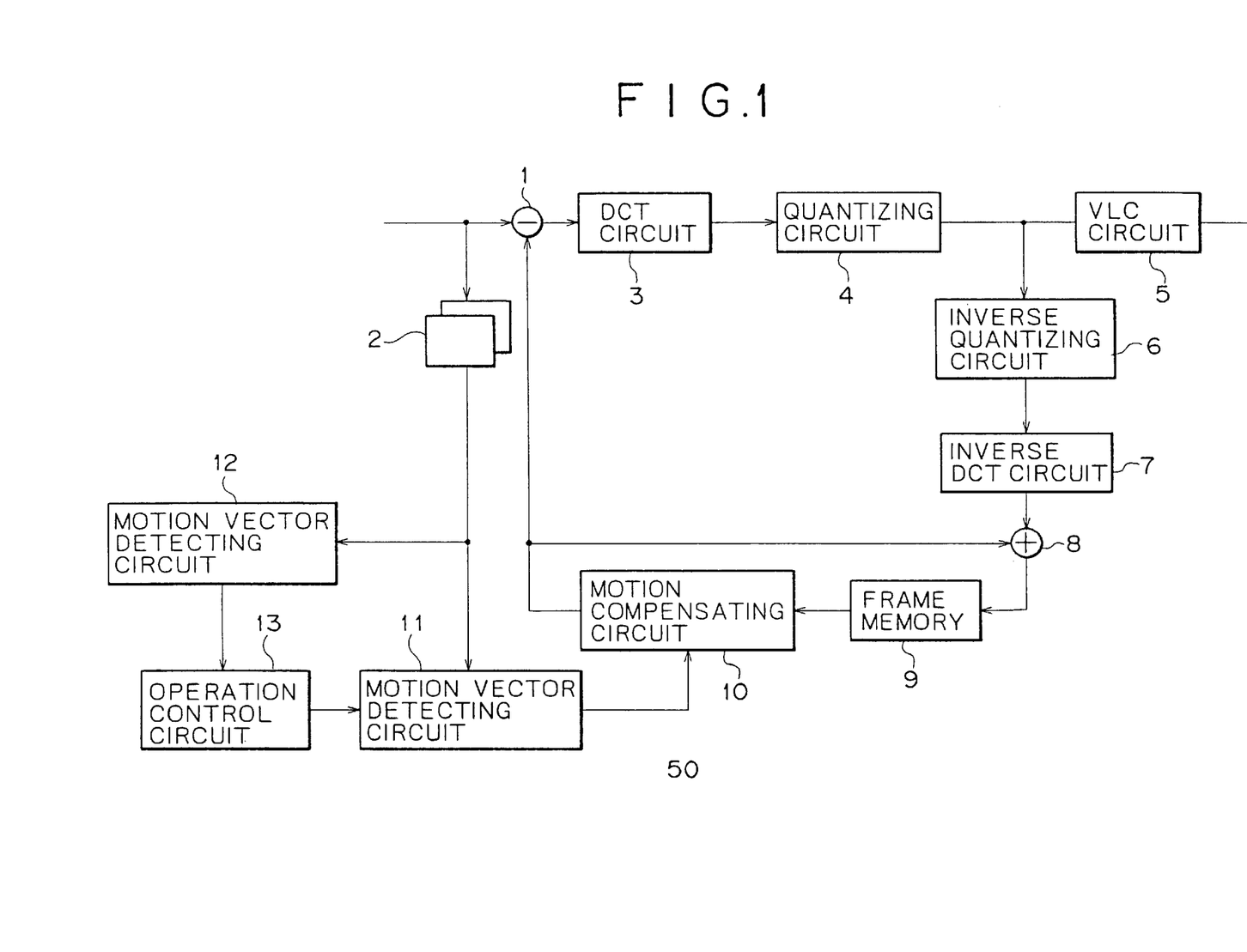
FIG. 1 illustrates an example of structure of the first embodiment of an image encoding apparatus 50 to which the present invention is applied.

FIG. 1 illustrates an example of structure of the first embodiment of the image encoding apparatus 50 to which the motion vector detecting apparatus of the present invention is applied. An image data is input to a subtracter 1 to calculate a residual from the forecasted image data supplied from a motion compensating circuit 10 and calculation result is then supplied to the DCT circuit 3. The DCT circuit 3 converts the input data by the DCT (Discrete Cosine Transform) conversion method to provide an output to a quantizing circuit 4. The quantizing circuit 4 quantizes the input DCT coefficient and provides an output to the VLC circuit 5 and inverse quantizing circuit 6. The VLC circuit 5 converts the quantized data input from the quantizing circuit 4 to VLC (Variable Length Code) and then transfers this code to the transmission path not illustrated.

The inverse quantizing circuit 6 inversely quantizes the quantizing data input from the quantizing circuit 4 and then provides an output to the inverse DCT circuit 7. The inverse DCT circuit 7 executes the inverse DCT process to the data input from the inverse quantizing circuit 6 and then provides an output to an adder 8. The adder 8 adds the forecasted image data input from the motion compensating circuit 10 and the data (residual data) supplied from the inverse DCT circuit 7 to return the data to the original image data and then supplies this data to the frame memory 9 to store this data.

The image data read from a frame memory 9 is then compensated in the motion by a motion compensating circuit 10 and thereafter it is supplied as the forecasted image data to the subtracter 1 and adder 8.

On the other hand, the input image data is supplied to the frame memory 2 and is then stored therein. It is also read as required and is then supplied to the motion vector detecting circuit 11 and motion vector detecting circuit 12. The motion vector detecting circuit 12 calculates a residual between the reference block of the reference frame read from the frame memory 2 and the retrieving block in the preset position of the retrieving frame and then outputs the calculation result to the operation control circuit 13.

The operation control circuit 13 is requested to output the control signal based on the calculation result output from the motion vector detecting circuit 12 to the motion vector detecting circuit 11. The motion vector detecting circuit 11 detects the motion vector on the basis of the method corresponding to the control signal from the operation control circuit 13 and supplies it to the motion compensating circuit 10.

Next, operations will then be explained. The input image data is supplied to a subtracter 1. To this subtracter 1, the forecasted image data which is read from the frame memory 9 and compensated in motion corresponding to the motion vector in the motion compensating circuit 10 and the subtracter 1 subtracts this forecasted image data from the input image data and then outputs its residual data to the DCT circuit 3. The DCT circuit 3 executes the DCT conversion of the input residual data and then outputs it to the quantizing circuit 4. The quantizing circuit 4 quantizes the input DCT coefficient and then supplies it to the VLC circuit 5. The VLC circuit 5 converts the input quantized data to the variable length code and then outputs it.

The inverse quantizing circuit 6 inversely quantizes the quantized data output from the quantizing circuit 4 and then outputs the result to the inverse DCT circuit 7. The inverse DCT circuit 7 executes the inverse DCT conversion to the input quantized data to obtain the original residual data and then output this data to an adder 8. To this adder 8, the forecasted image data output from the motion compensating circuit 10 is also supplied and the residual data output from the inverse DCT circuit 7 is added to this forecasted image data and thereby returned to the original image data. Thereafter, the original image data is then supplied to the frame memory 9 and is stored therein.

Figure 2:
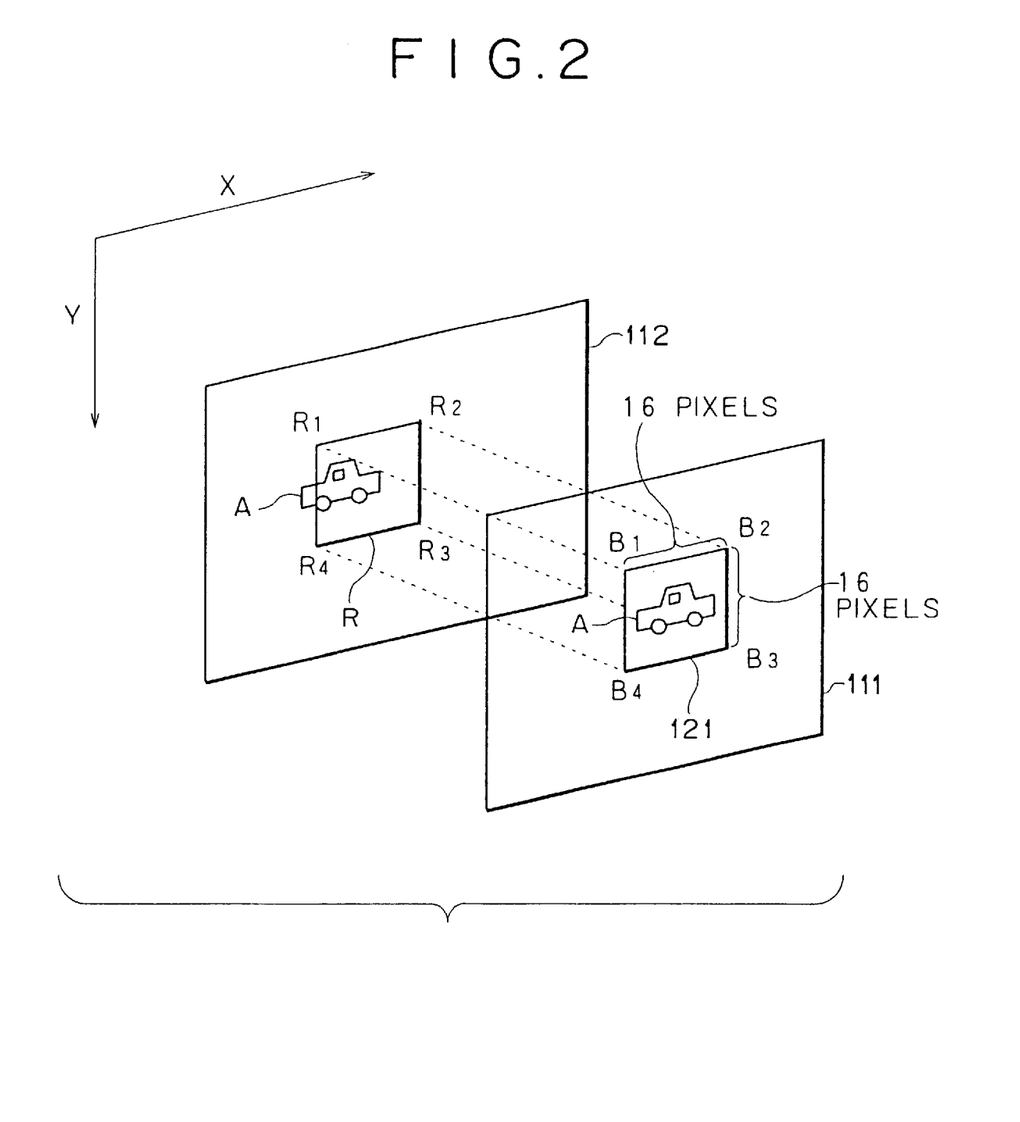
FIG. 2 illustrates an example of the retrieving block R.

The motion vector detecting circuit 12 calculates a residual between the pixel data of the reference block (range defined by the pixel B1 (x1, y1), pixel B2 (x2, y2) pixel B3 (x3, y3), pixel B4 (x4, y4), pixel B2 (x2, y2), pixel B3 (x3, y3), pixel B4 (x4, y4)) 121, for example, of the reference frame 111 illustrated in FIG. 2 output from the frame memory 2 and the pixel data of the retrieving block (range defined by the pixel R1 (x11, y11), pixel R2 (x12, y12), pixel R3 (x13, yl3), pixel R4 (x14, y14)) R at the preset position of the retrieving frame 112, moreover calculates the sum of the absolute values and then output the result to the operation control circuit 13 as the residual E for the reference block 121 of the retrieving block R.

Figure 3:
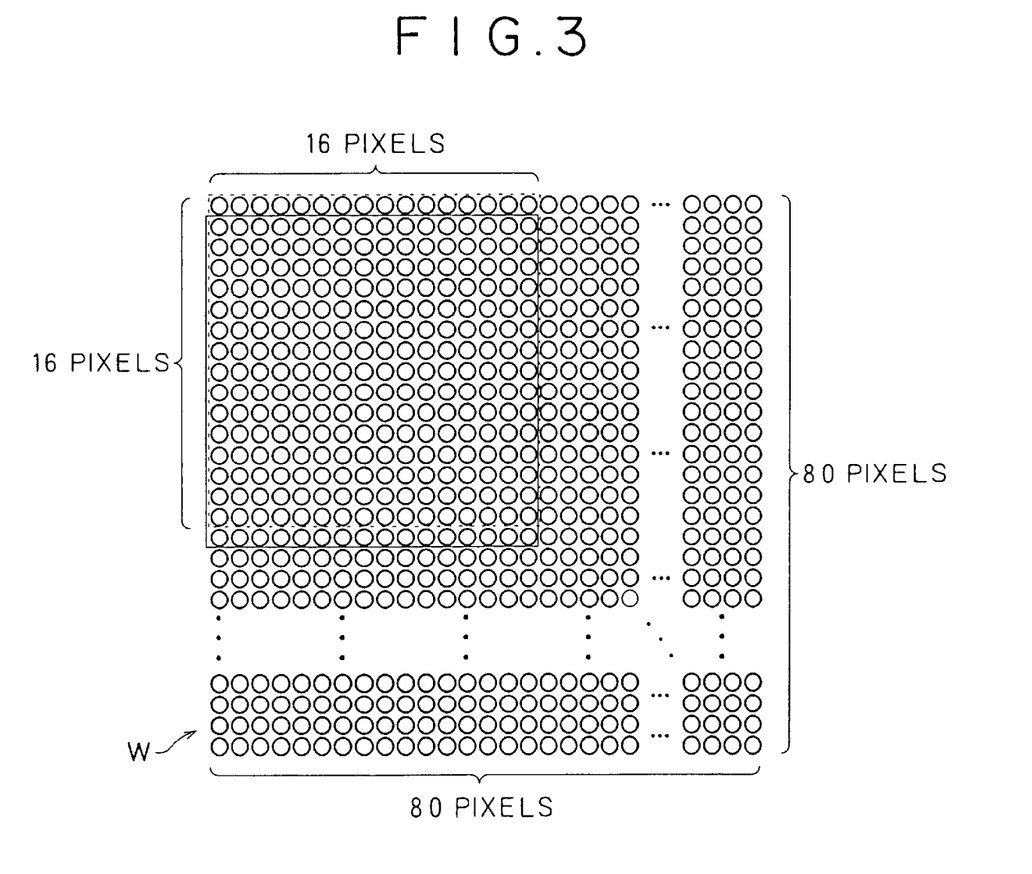
FIG. 3 illustrates the retrieving range W.

The operation control circuit 13 discriminates whether value of the residual E supplied from the motion vector detecting circuit 12 is larger than two threshold values (threshold value Th1 and the threshold value Th2 smaller than Th1) or not in this example and then outputs the control signal to the motion vector detecting circuit 11 corresponding to the discrimination result. For example, when the image is the moving image when an automobile A is running at a higher speed, the retrieving block R does not include the image of automobile A, like the FIG. 8, as in the case of the retrieving block 122 indicated by the solid line in the retrieving frame 112 and such moving image is different from the image of the reference block 121 to a large extent, a value of the residual E for the reference block 121 of the retrieving block R becomes large. As explained above, when the residual E is large and it is larger, for example, than the threshold value Th1 (when the relationship residual E>threshold value Th1>threshold value Th2 can be established), the operation control circuit 13 outputs, to the motion vector detecting circuit 11, the control signal C1 for instructing execution of the motion vector detecting process utilizing the comparatively wide retrieving range W of the 80×80 pixels as illustrated in FIG. 3.

Figure 4:
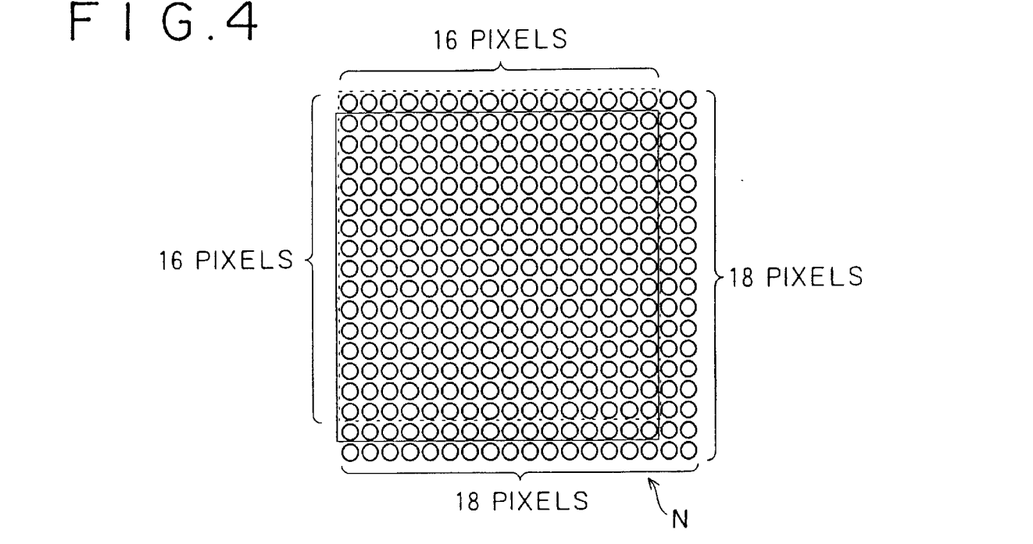
FIG. 4 illustrates the retrieving range N.
Figure 8:
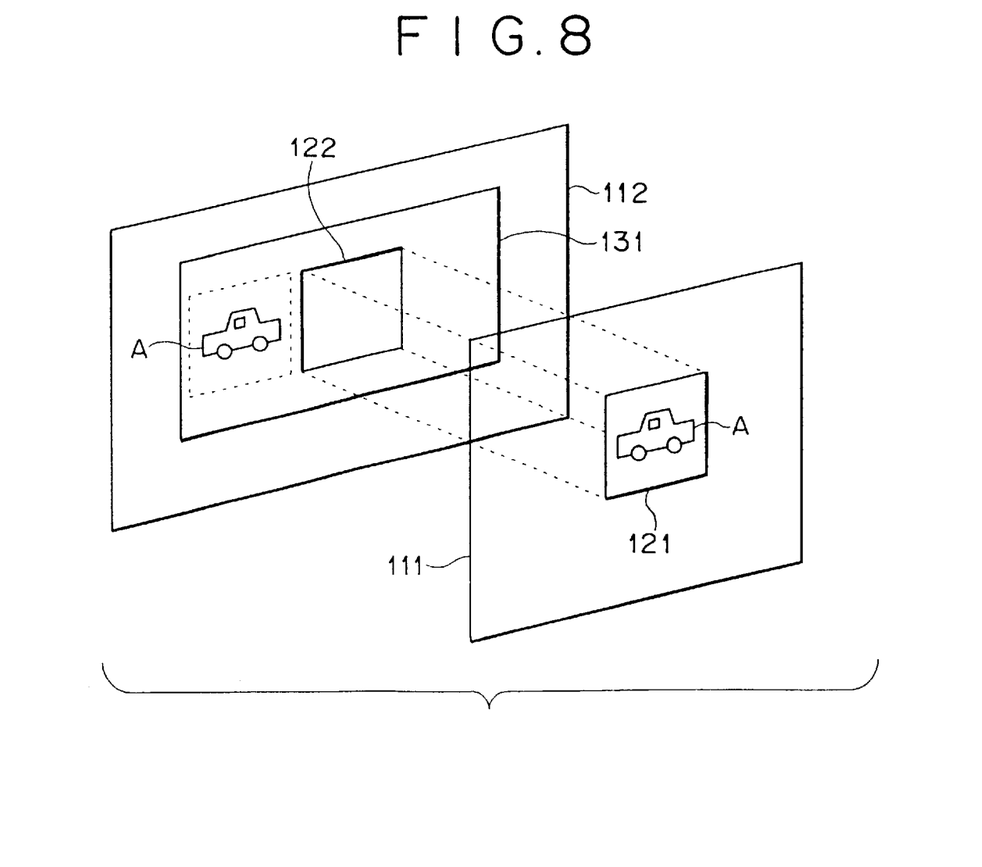
FIG. 8 illustrates the motion vector detecting process of the related art.

Moreover, for example, when the image is the moving image while the automobile A is running at a low speed in comparison with FIG. 8 and the retrieving block R includes a part of the image of automobile A as illustrated in FIG. 2, value of the residual E for the reference block 121 of the retrieving block R becomes smaller than that of FIG. 8. As explained above, when the value of residual E is small to a certain extent and it is less than the threshold value Th1, for example, and larger than the threshold value Th2 (when the relation threshold value Th1>=residual E>threshold value Th2 is established), the operation control circuit 13 outputs, to the motion vector detecting circuit 11, the control signal C for instructing execution of the motion vector detecting process utilizing the comparatively narrow retrieving range N of the 18×18 pixels as illustrated in FIG. 4.

Figure 5:
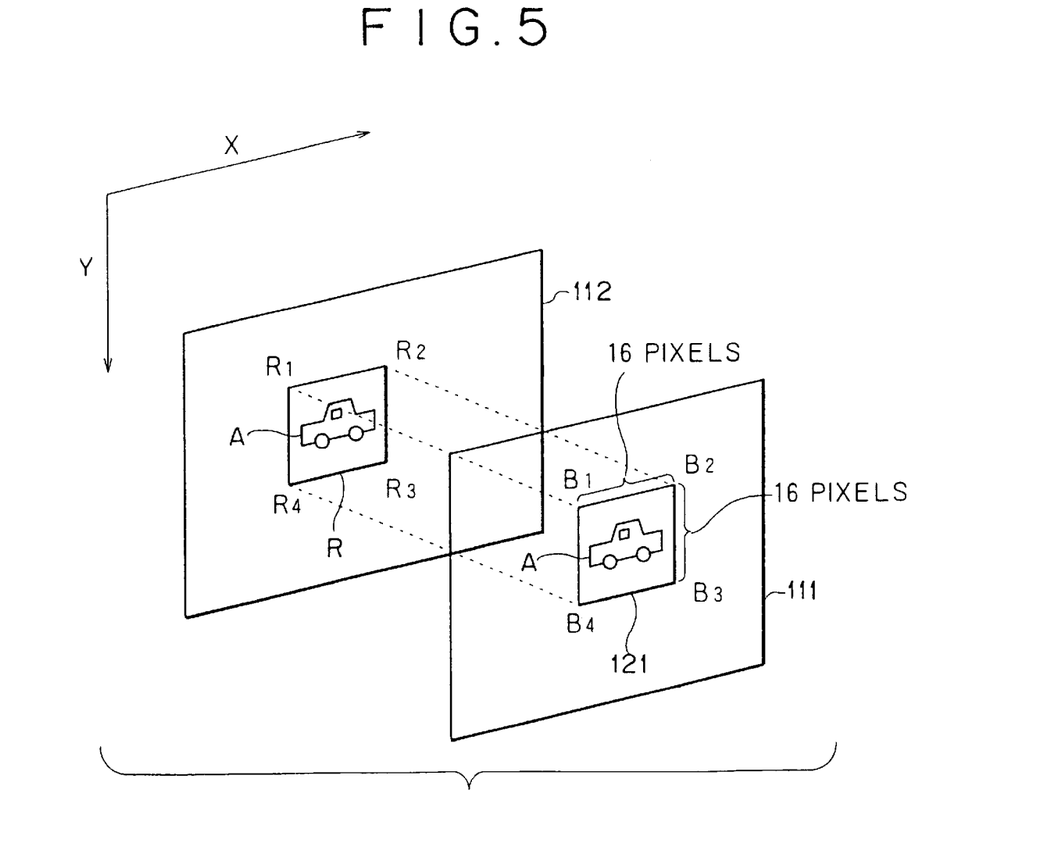
FIG. 5 illustrates the other example of the retrieving block R.

Moreover, when the image indicates that the automobile A is running at the speed slower than that in FIG. 2 and is almost in the stopping condition and the retrieving block R includes the almost same image as that of the retrieving block 121 as illustrated in FIG. 5, the residual E for the reference block 121 of the retrieving block R becomes smaller. As explained above, when the value of residual E is smaller and it is, for example, less than the threshold value Th2 (when the relation residual E=<threshold value Th2<threshold value Th1 is established, the operation control circuit 13 outputs the control signal C3 for instructing stop of execution of the motion vector detecting process to the motion vector detecting circuit 11.

The motion vector detecting circuit 11 executes the motion vector detecting process corresponding to the three control signals C1, C2, C3 output from the operation control circuit 13 and then outputs the motion vector obtained to the motion compensating circuit 10.

Figure 6:
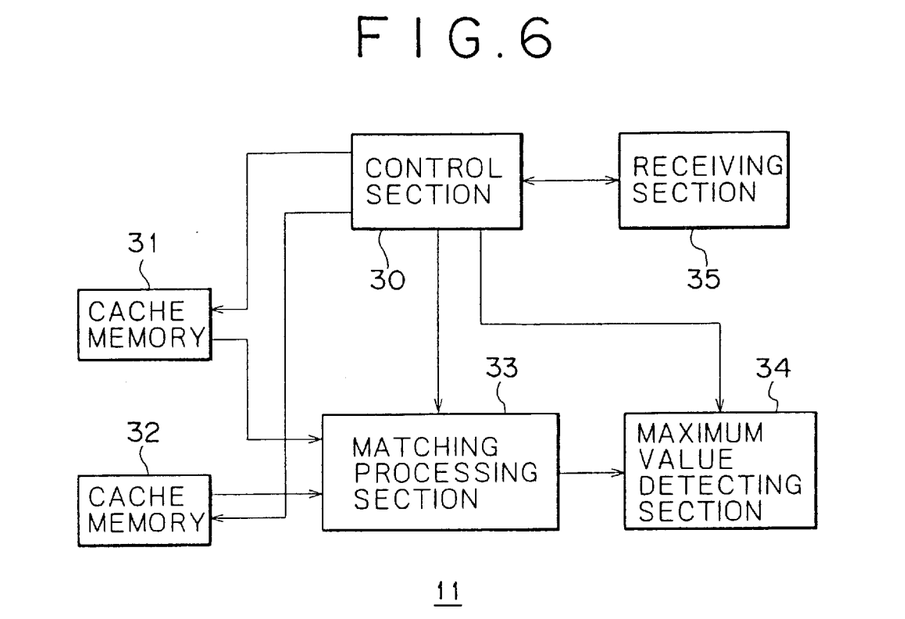
FIG. 6 illustrates an example of structure of the motion vector detecting circuit of FIG. 1.

Next, with reference to FIG. 6, an example of structure of the motion vector detecting circuit 11 will be explained. To a cache memory (hereinafter, referred to only as memory) 31, the pixel data of the reference block 121 set to the reference frame 111 among the image data being stored in the frame memory 2 is supplied and is then stored therein. In the cache memory (hereinafter referred to only as memory) 32, the pixel data of the retrieving range W or N set to the retrieving frame 112 among the image data being stored in the frame memory 2 is supplied and then stored therein.

The retrieving block extracted from the retrieving range W or N is described as retrieving block 122 in the motion vector detecting circuit 11, while the retrieving block at the preset position is described as the retrieving block R in the motion vector detecting circuit 12.

The matching processing section 33 calculates a residual between the pixel data of the reference block 121 stored in the memory 31 and the retrieving block 122 extracted from the retrieving range W or N stored in the memory 32 and outputs the result of calculation to a minimum value detecting section 34. The minimum value detecting section 34 outputs, as the motion vector, the data indicating the position in the retrieving range W or N of the retrieving block 122 indicating the minimum residual among the calculation result (residual) output from the matching processing section 33 to the motion compensating circuit 10. In this example, the reference block 121 and retrieving block 122 are assumed to be structured by the 16×16 pixels.

The receiving section 35 receives the control signal output from the operation control circuit 13 and supplies this signal to the control section 30. The control section 30 controls the memory 31 to the receiving section 35 to execute the predetermined processes.

Next, the operation will be explained. For example, when the control section 30 of the motion vector detecting circuit 11 receives the control signal C1 from the operation control circuit 13 via the receiving section 35, namely when the moving image moves at a high speed and residual between the reference block 121 and retrieving block R is large in the motion vector detecting circuit 12, the control section reads the pixel data of the retrieving range W from the image data of the retrieving frame stored in the frame memory 2 and causes the memory 32 to store this pixel data and instructs to the matching processing section 33 to execute the matching process.

In the matching processing section 33, the 16×16 pixel data in the upper left side is extracted as the retrieving block 122 as indicated by the dotted line in FIG. 3 and a residual to the 16×16 pixel data of the reference block 121 stored in the memory 31 is calculated. A sum of the absolute values is output to the minimum value detecting section 34 as the residual to the reference block 121 of the retrieved block 122.

Next, this retrieving block 122 is moved to the lower side as much as one pixel. Namely, the retrieving block 122 is changed to the block indicated by a solid line from the block indicated by a broken line. Even in this retrieving block 122, a residual is also calculated and is then output to the minimum value detecting section 34. When the retrieving block 122 is moved to the lowest position in the retrieving range W, the retrieving block 122 is moved up to the highest position and is also moved to the right side as much as one pixel. Similar operations are repeated. Namely, in this case, since the retrieving block 122 of 16×16 pixels is respectively moved to the left side and right side as much as 32 pixels and is also moved in the upper side and lower side as much as 32 pixels, the 4335 (65×65) retrieving blocks 122 are extracted from the retrieving range W and residual for these reference block 121 is calculated.

The minimum value detecting section 34 considers the data indicating the position of the retrieving range W of the retrieving block 122 showing the minimum residual among 4225 residuals supplied from the matching processing section 33 and then outputs this data to the motion compensating circuit 10 depending on the control of control section 30.

When the speed of moving image is higher than the constant rate as explained above, the motion vector is detected depending on the comparatively wide retrieving range W and therefore motion compensation can be realized without any deterioration of image.

In addition, the control section 30 of the motion vector detecting circuit 11 receives the control signal C2 from the operation control circuit 13 via the receiving section 35, namely when a residual between the reference block 121 and retrieving block R is large (small) to a certain extent in the motion vector detecting circuit 12 as in the case of FIG. 2, the control section 30 reads the pixel data of the retrieving range N from the image data of the retrieving frame 112 stored in the frame memory 2 and stores it in the memory 32 and then instructs the matching processing section 33 to execute the matching process.

In the matching processing section 33, the 16×16 pixel data in the left upper side among the pixel data in the retrieving range N are extracted as the retrieving block 122 and the residual to the 16×16 pixel data of the reference block stored in the memory 31 is calculated as indicated by the frame of dotted line in FIG. 4. A sum of the absolute values is output to the minimum value detecting section 34 as the residual to the reference block 121 of the retrieving block 122. The process similar to that in the retrieving range W is repeated and the minimum value detecting section 34 outputs, as the motion vector, the data indicating the position of the retrieving range N of the retrieving block 122 showing the minimum residual among the residuals supplied from the matching processing section 33 to the motion compensating section 10. In this case, the 16×16 pixel retrieving block 122 can be moved in the right and left directions as much as one pixel and can also be moved in the upper and lower directions as much as one pixel. Therefore, the nine (9=3×3) retrieving blocks 122 can be extracted from the retrieving range N to calculate the residual for these reference blocks 121.

As explained above, since the motion vector is detected from the comparatively narrower retrieving range for the moving image which is moving at a lower moving speed, the number of times of residual calculating process can be reduced without deterioration of the image quality.

In addition, upon reception of the control signal C3 from the operation control circuit 13 via the receiving section 35, namely when the images of the reference block 121 and retrieving block R are almost same and residual of these images are small as in the case of FIG. 5, the control section 30 of the motion vector detecting circuit 11 stops operation of the memory 31, memory 32 and matching circuit 33 and then controls the minimum value detecting section 34 to output the zero vector V (0, 0) to the motion compensating circuit 10.

As explained above, since the preset zero vector (0, 0), for example, is output for the image the moving image which is almost in the stop condition, it is also possible to eliminate the calculation of residual for the reference block 121 of the retrieving block 122.

As explained above, since the motion vector is detected corresponding to the input image data, the number of times of the arithmetic operations to obtain the residual for the reference block 121 of the retrieving block 122 in the motion vector detecting circuit 11 can be reduced. For example, 4225 retrieving blocks 122 are extracted from the retrieving range W and the arithmetic operations can be executed as much. Meanwhile, only nine (9) retrieving blocks 122 are extracted from the retrieving range N and the arithmetic processes are executed as much as such retrieving blocks. Namely, the number of times of arithmetic operation for obtaining the residual can be reduced to 0.2% (=9/4225) by detecting the motion vector on the basis of the retrieving range N in place of the retrieving range W. As a result, for example, in the image encoding apparatus 50, the electrical power required to execute the arithmetic operations can be saved.

Moreover, when the motion vector is detected on the basis of the retrieving range N, the pixel data stored and read from the memory 32 corresponds to the 324 (=18×18) pixels of the retrieving range N. Meanwhile, when the motion vector is detected on the basis of the retrieving range W, the image data stored and read from the memory 32 corresponds to the 6400 (=80×80) pixels of the retrieving range W. Namely, the data stored and read from the memory 32 can be set to 5% (=324/6400) by detecting the motion vector on the basis of the retrieving range N in place of the retrieving range W. As a result, the power to be required to execute such processes can further be saved as much.

In above explanation, when the residual E calculated by the motion vector detecting circuit 12 is less than the threshold value Th2, the zero vector V (0, 0) is output to the motion compensating circuit 10 from the motion vector detecting circuit 11, but it is also possible to execute the setting so that the other data (motion vector) calculating the residual E from the reference block 121 can be output. In addition, it is also possible to set the combination of a plurality of data to output the data showing the minimum value of residual E.

Figure 7:
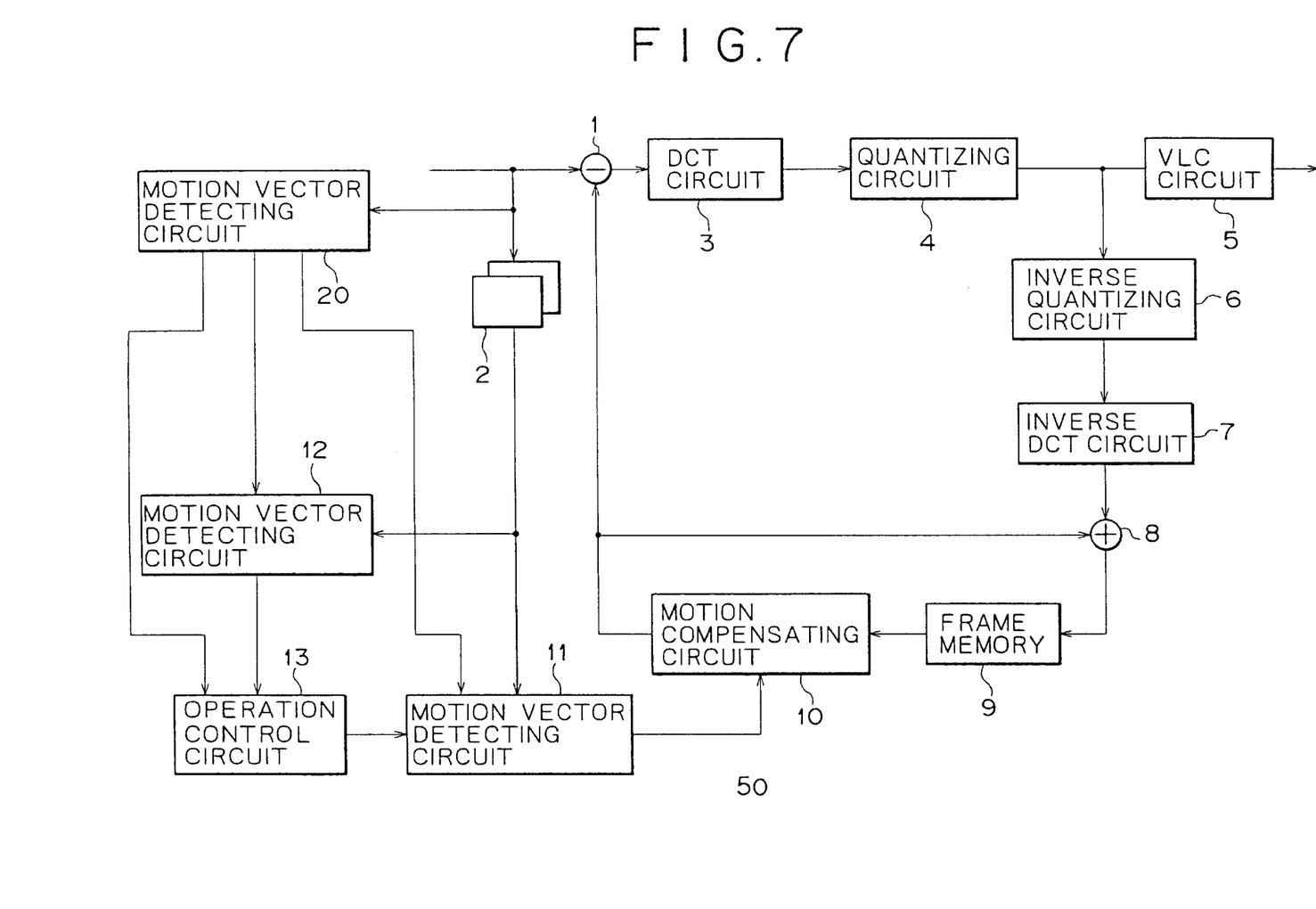
FIG. 7 illustrates an example of structure of the second embodiment of the image encoding apparatus 50 to which the present invention is applied.

FIG. 7 illustrates an example of structure of the second embodiment of the image encoder 50 to which the motion vector detecting apparatus of the present invention is applied. The elements like those in FIG. 1 are designated by the like reference numerals and the same explanation is not repeated here. In this example, a motion vector detecting circuit 20 is provided in the preceding stage of the motion vector detecting circuit 12.

The motion vector detecting circuit 20 can detect the motion vector of the image data input to the frame memory 2, based on the image data in the unit larger than that of the reference block 121 (retrieving block 122), for example, the image data obtained by dividing the image data and frame of one slice into eight (8) sub-data, prior to the process of the image data stored in the frame memory 2 (for example, before several frames).

For example, when the detected motion vector is smaller than the predetermined value, namely when the image input to the image encoder 50 is a stationary image or panned image, the motion vector detecting circuit 20 causes the motion vector detecting circuit 11 and motion vector detecting circuit 12 not to receive the supply of image data from the frame memory 2, controls the operation control circuit 13 and then outputs the control signal C3 to the motion vector detecting circuit 11. Accordingly, data is never supplied to the motion vector detecting circuits 11 and 12 from the frame memory 2 and calculation for obtaining residual is not performed and thereby the zero vector V(0, 0) is output to the motion compensating circuit 10. Thereby, the electrical power required for the processing can be saved in the second embodiment, in comparison with the first embodiment illustrated in FIG. 1, as much as the effect that the image data is not supplied to the motion vector detecting circuits 11 and 12 from the frame memory 2.

When the detected motion vector is higher than the predetermined value, the motion vector detecting circuit 20 executes, in the second embodiment, the processes similar to that in the first embodiment illustrated in FIG. 1. Namely, on the basis of the amplitude of motion vector detected by the motion vector detecting circuit 12, the motion vector detecting circuit 11 detects, or outputs the motion vector or the zero vector V(0,0) based on the retrieving range W or N.

As the distribution medium for distributing the computer program to execute the processes explained above to users, the communication medium such as network and satellite or the like can be used in addition to the recording medium such as magnetic disk, CD-ROM and solid state memory, etc.

According to the motion vector detecting apparatus, motion vector detecting method and distribution medium of the present invention, since the retrieving range can be selected based on the input image, the motion vector can be detected more effectively.

What is claimed is:

1. A motion vector detecting apparatus for detecting a motion vector to compensate for movement when encoding input image data, comprising:

a first motion vector detecting circuit for extracting a retrieving block from a current frame of the input image data on the basis of a retrieving range, and calculating a residual value between the retrieving block and a reference block from a reference frame of the input image data;

an operation control circuit for adjusting the retrieving range by comparing the residual value calculated by the first motion vector detecting circuit to a first threshold value and a second threshold value; the first threshold value being greater than said second threshold value; and a second motion vector detecting circuit for detecting a motion vector for said current frame on the basis of the adjusted retrieving range from said operation control circuit, and outputting said motion vector to a motion compensating circuit.

2. The motion vector detecting apparatus according to claim 1, wherein the operation control circuit increases the retrieving range when the residual value is greater than said first threshold value; decreases the retrieving range when the residual value is less than said first threshold value and greater than said second threshold value; and stops operation of the second motion vector detecting circuit when the residual value is less than said second threshold value.

3. A motion vector detecting method of detecting a motion vector to compensate for movement when encoding input image data, comprising the steps of:

extracting a retrieving block from a current frame of the input image data on the basis of a retrieving range;

calculating a residual value between the retrieving block and a reference block from a reference frame of the input image data;

adjusting the retrieving range by comparing the residual value to a first threshold value and a second threshold value; the first threshold value being greater than said second threshold value; and detecting a motion vector for said current frame on the basis of the adjusted retrieving range and outputting said motion vector to a motion compensating circuit.

4. The motion vector detecting method according to claim 3, wherein the adjusting step increases the retrieving range when the residual value is greater than said first threshold value; decreases the retrieving range when the residual value is less than said first threshold value and greater than said second threshold value; and stops operation of the detecting step when the residual value is less than said second threshold value.

* * * * *